(12) United States Patent
Lee et al.

(10) Patent No.: US 7,099,743 B2
(45) Date of Patent: Aug. 29, 2006

(54) TWO-LEGGED WALKING ROBOT

(75) Inventors: Yong-kwun Lee, Suwon (KR); Yeon-taek Oh, Yongin (KR); Soo-sang Yang, Suwon (KR); Ja-woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 10/643,898

(22) Filed: Aug. 20, 2003

(65) Prior Publication Data

US 2004/0133307 A1    Jul. 8, 2004

(30) Foreign Application Priority Data

Dec. 23, 2002    (KR) ............... 10-2002-0082459

(51) Int. Cl.
*G06F 19/00* (2006.01)

(52) U.S. Cl. .............. 700/245; 700/246; 700/247; 700/249; 700/250; 700/258; 700/260; 318/568.1; 318/568.11; 318/568.12; 900/1; 900/2; 900/9

(58) Field of Classification Search ........... 700/245, 700/246, 247, 249, 250, 252, 253, 254, 258, 700/260; 901/1, 2, 9; 701/23; 180/8.1, 180/8.6; 318/568.1, 568.11, 568.12, 568.15, 318/568.16, 568.17, 568.22, 568.25
See application file for complete search history.

(56) References Cited

U.S. PATENT DOCUMENTS

| | | | |
|---|---|---|---|
| 4,556,360 A | | 12/1985 | Hoffmann |
| 6,472,839 B1 | | 10/2002 | Ishii et al. |
| 6,832,131 B1 | * | 12/2004 | Hattori et al. ............ 700/245 |
| 6,898,485 B1 | * | 5/2005 | Kuroki et al. ........... 700/245 |
| 6,901,313 B1 | * | 5/2005 | Mori et al. ............. 700/245 |
| 2002/0061504 A1 | * | 5/2002 | Saijo et al. ............ 434/268 |
| 2002/0079857 A1 | | 6/2002 | Ishii et al. |

FOREIGN PATENT DOCUMENTS

| | | |
|---|---|---|
| CN | 1289665 A | 4/2001 |
| DE | 3247866 | 6/1984 |
| EP | 1083120 A2 | 3/2001 |
| FR | 2807959 | 4/2000 |
| FR | 2807959 A1 | 4/2000 |
| FR | 2 807 959 | 10/2001 |

(Continued)

OTHER PUBLICATIONS

Sardain et al., An anthroporphic biped robot: Dynamic concepts and technological design, 1998, IEEE, p. 823-838.*

(Continued)

*Primary Examiner*—Thomas G. Black
*Assistant Examiner*—McDieunel Marc
(74) *Attorney, Agent, or Firm*—Staas & Halsey LLP

(57) ABSTRACT

A two-legged walking robot includes a pair of foot members a calf member provided above each foot member, a double-axis ankle joint provided between the foot member and the calf member to allow the foot member to rotate relative to the calf member in forward and backward directions and in right and left directions. The robot also includes a femoral member provided above each calf member, a single-axis knee joint provided between the calf member and the femoral member, a hip member provided above the femoral member, and a double-axis hip joint provided between the femoral member and the hip member to allow the femoral member to rotate relative to the hip member in the forward, backward, right, and left directions. Thus, the two-legged walking robot operates similar to a human ankle, knee and hip.

36 Claims, 11 Drawing Sheets

| | FOREIGN PATENT DOCUMENTS | |
|---|---|---|
| JP | 5-228856 | 9/1973 |
| JP | 62-97006 | 5/1987 |
| JP | 5-228856 | 9/1993 |
| JP | 6-170758 | 6/1994 |
| JP | 7-285085 | 10/1995 |
| KR | 20-0168189 | 11/1999 |
| KR | 10-0249419 | 12/1999 |
| KR | 2000-62338 | 10/2000 |
| KR | 10-0378713 | 3/2003 |
| WO | WO 96/22859 | 8/1996 |
| WO | WO 02/28600 | 4/2002 |

OTHER PUBLICATIONS

Office Action issued by the Japanese Patent Office on Nov. 9, 2004.
The First Office Action issued by the State Intellectual Property Office of People's Republic of China in Application No. 03160207.X dated Mar. 10, 2006 (total of 10 pages).

* cited by examiner

TWO-LEGGED WALKING ROBOT

CROSS-REFERENCE TO RELATED APPLICATIONS

This application claims the benefit of Korean Patent Application No. 2002-82459, filed Dec. 23, 2002, in the Korean Intellectual Property Office, the disclosure of which is incorporated herein by reference.

BACKGROUND OF THE INVENTION

1. Field of the Invention

The present invention relates to a two-legged walking robot, and more particularly, to a two-legged walking robot having improved joint parts.

2. Description of the Related Art

Generally, a two-legged walking robot includes a skeletal frame to provide a pair of legs like human legs, a joint part pivotably provided between bones of the skeletal frame, and an actuator connected to bones to rotate the bones at the joint part.

The skeletal frame includes a foot member to step on a ground like a human foot, a calf member provided above the foot member, a femoral member provided above the calf member, and a hip member provided above the femoral member like a human hip.

The joint part includes an ankle joint provided between the foot member and the calf member, a knee joint provided between the calf member and the femoral member, and a hip joint provided between the femoral member and the hip member.

In the two-legged walking robot, the actuator connecting the foot member with the calf member rotates the foot member relative to the calf member about the ankle joint. The actuator connecting the calf member with the femoral member rotates the calf member relative to the femoral member about the knee joint, and the actuator connecting the femoral member with the hip member rotates the femoral member relative to the hip member about the hip joint.

As shown in FIG. 1, a conventional two-legged walking robot includes a foot member 11, a calf member 12, a femoral member 13, and a hip member 14, which are respectively connected by joint parts 15, 16, 17 and assembled into a leg assembly to support a robot body. Hereinafter, to avoid repetitive description, a mechanism of one leg assembly will be described because the left leg assembly and the right leg assembly are of the same configuration. The joint parts include an ankle joint 15, a knee joint 16 and a hip joint 17.

In the leg assembly, each member is connected to an actuator to provide a four-bar linkage (e.g., quadric crank mechanism). The actuator makes a linear-sliding motion with a ball screw. The linear-sliding motion changes a rotation angle between links, thereby bending or stretching the leg assemblies of the walking robot.

More particularly, to cause the bending and stretching operation in the ankle joint 15, a middle part of a first actuator 30a is pivotably connected to a middle part of the calf member 12 by a first link 21, and a slider 35a of the first actuator 30a is pivotably connected to a middle part of the foot member 11.

To cause the bending and stretching operation in the knee joint 16, a lower part of a second actuator 30b is pivotably connected to an upper part of the foot member 11 by a second link 22, and a middle part of the second actuator 30b is pivotably connected to a middle part of the femoral member 13 by a third link 23.

To cause the bending and stretching operation in the hip joint 17, a lower part of a third actuator 30c is pivotably connected to an upper part of the femoral member 13 by a fourth link 24, and a middle part of the third actuator 30c is pivotably connected to the hip member 14 by a fifth link 25.

According to the above, the bending and stretching operations in the joints 15, 16, 17 are performed by the actuators 30a, 30b, 30c, respectively.

The actuator 30a, 30b, 30c includes a motor 31a, 31b, 31c to rotate the ball screw 33a, 33b, 33c, an encoder 32a, 32b, 32c to determine a rotation state of the motor 31a, 31b, 31c, a guide rail 34a, 34b, 34c disposed parallel with the ball screw 33a, 33b, 33c, and the slider 35a, 35b, 35c coupled to the guide rail 34a, 34b, 34c and linearly movable by rotation of the ball screw 33a, 33b, 33c.

The slider 35a, 35b, 35c has a first part slidingly coupled to the guide rail 34a, 34b, 34c, and a second part having a female screw engaged with the ball screw 33a, 33b, 33c to be operated by the rotation of the ball screw 33a, 33b, 33c. The encoder 32a, 32b, 32c is attached to a rear of the motor 31a, 31b, 31c and employed to servo-control the motor 31a, 31b, 31c.

According to the above configuration, a walking operation of the conventional two-legged walking robot is achieved by the actuators 30a, 30b, 30c connected to the joints 15, 16, 17.

However, in the conventional two-legged walking robot, the joints 15, 16, 17 allow the leg assemblies to be bent and stretched in only forward and backward directions, so that the leg assemblies have a low degree of freedom as compared to the human legs.

SUMMARY OF THE INVENTION

Accordingly, it is an aspect of the present invention to provide a two-legged walking robot improved in a degree of freedom for a leg assembly.

Additional aspects and advantages of the invention will be set forth in part in the description which follows and, in part, will be obvious form the description, or may be learned by practice of the invention.

The foregoing and/or other aspects of the present invention are achieved by providing a two-legged walking robot including a pair of foot members, a calf member provided above each of the foot members, a double-axis ankle joint provided between each of the respective foot member and the calf member to allow the foot member to rotate relative to the calf member in forward and backward directions and in right and left directions, and a pair of first actuators coupled to both of each of the respective foot member and the calf member to rotate the foot member relative to the calf member about the ankle joint in the forward, backward, right, and left directions. The robot also includes a femoral member provided above each of the calf members, a single-axis knee joint provided between each of the respective calf member and the femoral member, a second actuator coupled to both of each of the respective calf member and the femoral member to rotate the calf member relative to the femoral member about the knee joint in forward and backward directions, and a hip member provided above each of the femoral members. The robot includes a double-axis hip joint provided between each of the respective femoral member and the hip member to allow the femoral member to rotate relative to the hip member in the forward, backward, right, and left directions, and a pair of third actuators coupled to both of each of the respective femoral member and the hip member to rotate the femoral member relative to the hip member about the hip joint in the forward, backward, right, and left directions.

According to an aspect of the invention, each of the ankle joints include a first yoke incorporated with an upper part of the foot member, and a second yoke incorporated with a lower part of the calf member and coupled to the first yoke so as to rotate the foot member relative to the calf member.

According to an aspect of the invention, the first yoke includes a first bracket incorporated with the upper part of the foot member, a pair of first supporters upwardly extended from front and rear end parts of the first bracket, and a first-axle to pass through the first supporters in the forward and backward directions. The second yoke includes a second bracket incorporated with the lower part of the calf member, a pair of second supporters downwardly extended from left and right end parts of the second bracket, and a second-axle to pass through second supporters in left and right directions and incorporated with the first-axle.

According to an aspect of the invention, each of the hip joints include a third yoke incorporated with an upper part of the femoral member, and a fourth yoke incorporated with a lower part of the hip member and coupled to the third yoke so as to rotate the femoral member relative to the femoral member.

According to an aspect of the invention, each of the hip joints are combined to the hip member rotatably about a vertical axis. The robot further includes a pair of fourth actuators provided in the hip member to rotate each of the respective femoral members relative to the hip member.

According to an aspect of the invention, the robot further includes a first link provided between a lower part of the respective first actuators and the foot member so as to rotate the first actuators relative to the foot member, and a second link provided between an upper part of the respective first actuators and the calf member so as to rotate the first actuators relative to the calf member.

According to an aspect of the invention, the robot further includes a third link provided between a lower part of the respective second actuator and the calf member so as to rotate the second actuator relative to the calf member, and a fourth link provided between an upper part of the respective second actuator and the femoral member so as to rotate the second actuator relative to the femoral member.

According to an aspect of the invention, the robot further includes a fifth link provided between a lower part of the respective third actuators and the femoral member so as to rotate the third actuators relative to the femoral member, and a sixth link provided between an upper part of the respective third actuators and the hip member so as to rotate the third actuators relative to the hip member.

According to an aspect of the invention, the second actuator is provided in front of the calf member, and an upper part of the third link is pivotably coupled to the lower part of the second actuator, and a hinge part on which the third link and the second actuator are pivoted is positioned above the knee joint, so that the calf member is rotated backward relative to the femoral member beyond a right angle.

According to an aspect of the invention, the pair of third actuators is provided behind the femoral member, a lower part of the sixth link is rotatably coupled to the upper part of the third actuators, and a hinge part on which the sixth link and the third actuators are pivoted is positioned below the hip joint, so that the femoral member is rotated forward relative to the hip member beyond a right angle.

According to an aspect of the invention, the robot further includes a shaft to protrude upwardly from the fourth yoke of the hip joint. The shaft passes through the hip member and is rotatably coupled to the hip member, and the fourth actuators are rotatably coupled to the shaft to rotate the shaft.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
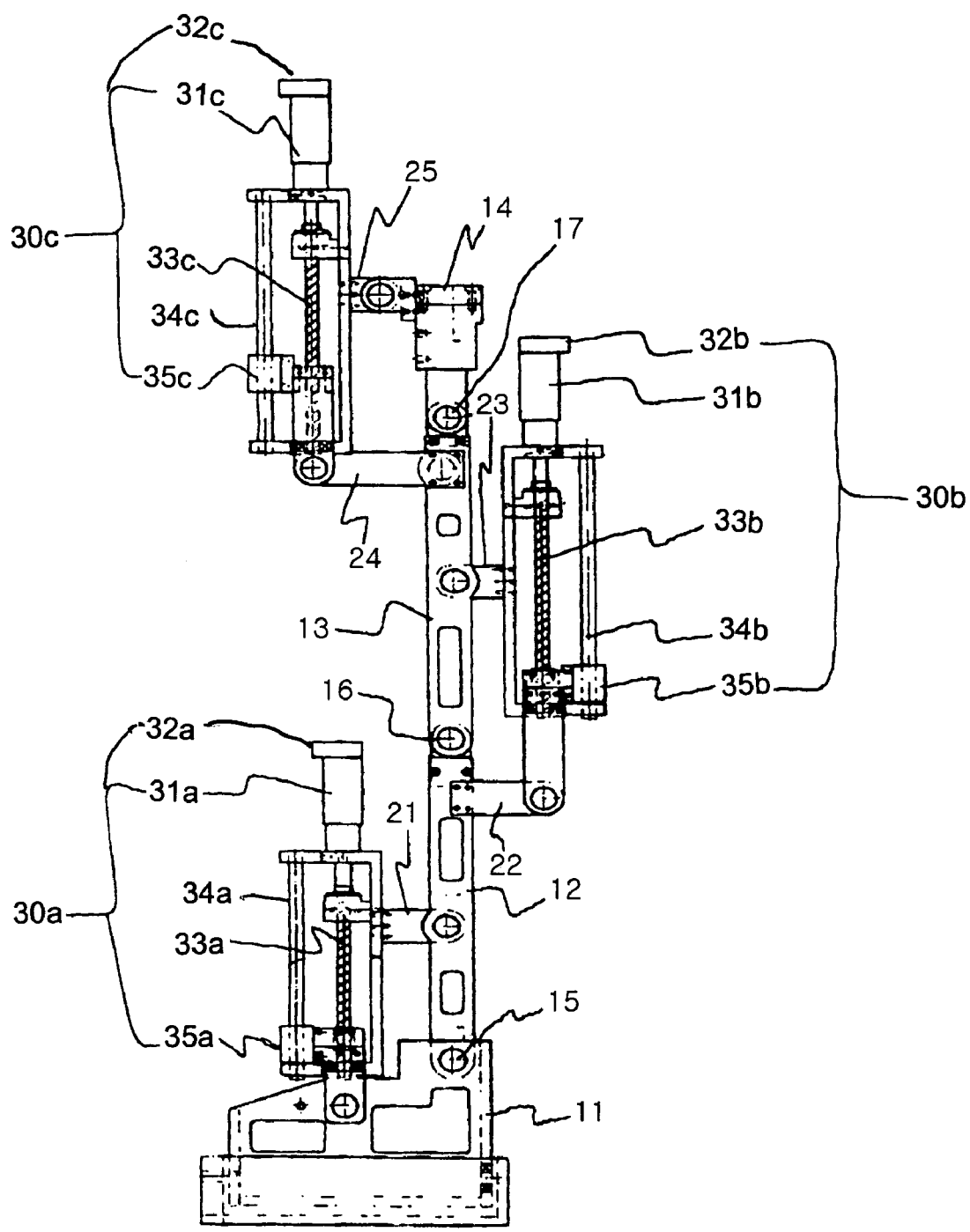
FIG. 1 is a side view of a conventional two-legged walking robot.

Reference will now be made in detail to the embodiments of the present invention, examples of which are illustrated in the accompanying drawings, wherein like reference numerals refer to like elements throughout.

Hereinafter, left, right, forward and backward directions are defined with reference to a forward movement of a walking robot.

Figure 2:
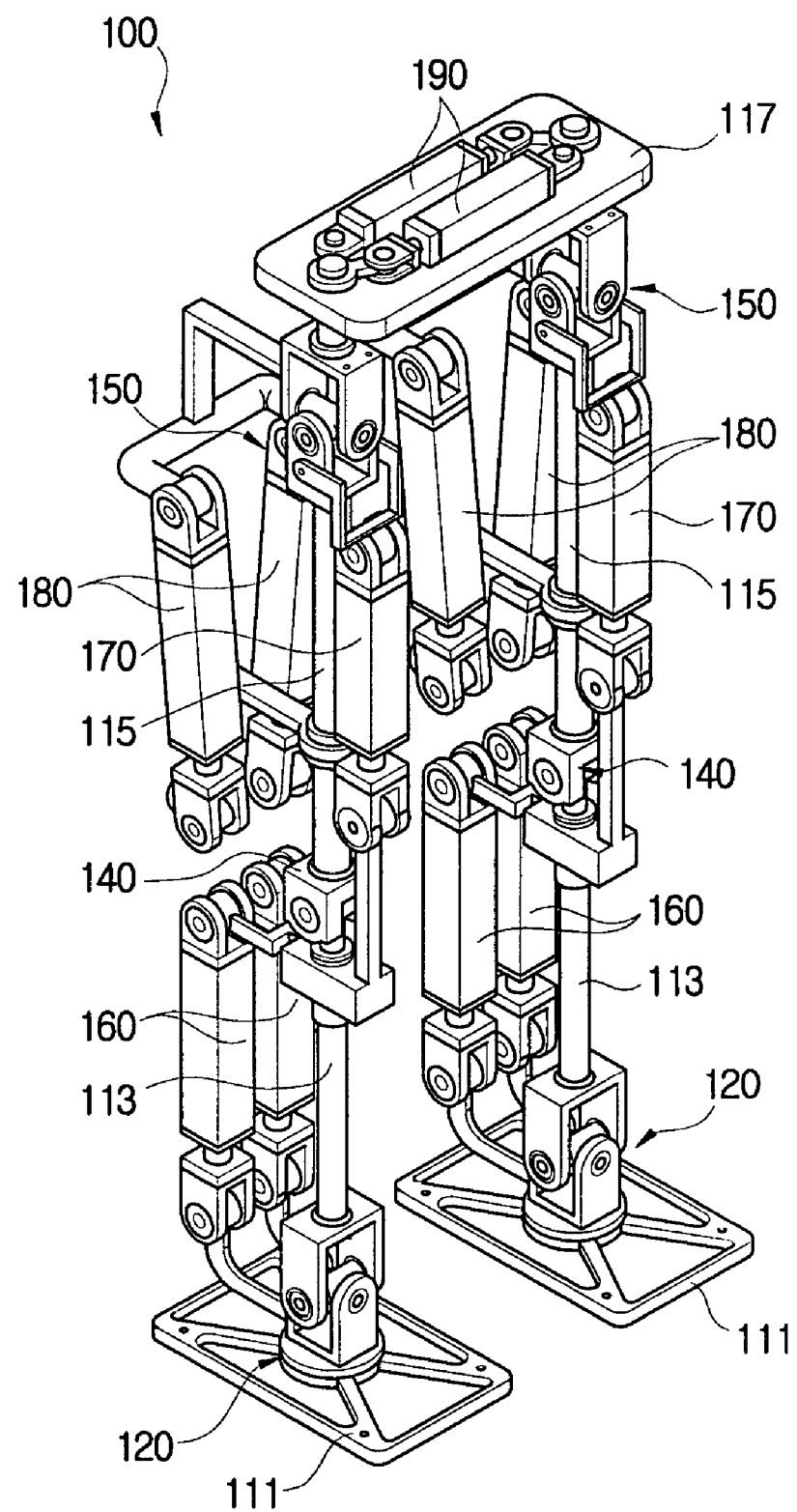
FIG. 2 is a perspective view of a two-legged walking robot, according to an embodiment of the present invention.
Figure 3:
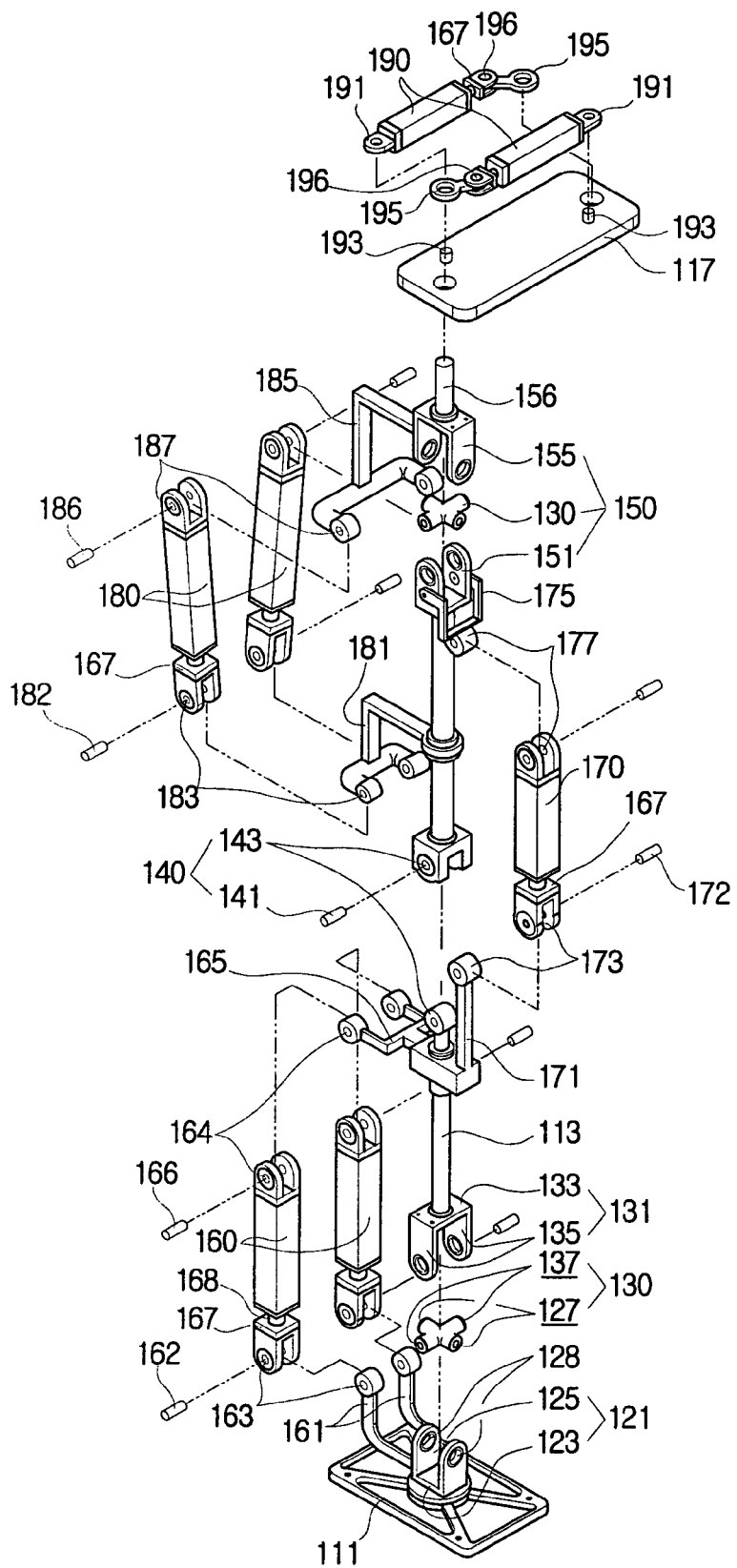
FIG. 3 is an exploded perspective view of the two-legged walking robot of FIG. 2.

As shown in FIGS. 2 and 3, a two-legged walking robot 100 according to the present invention includes a pair of foot members 111 to step on a ground like a human foot, a pair of calf members 113 respectively provided above the foot members 111, a pair of femoral members 115 respectively provided above the calf members 113, a hip member 117 provided above the femoral members 115 like a human hip, and a double-axis ankle joint 120 (universal joint) provided between the foot member 111 and the calf member 113. The robot also includes a pair of first actuators 160 coupled to both the foot member 111 and the calf member 113 to rotate the foot member 111 relative to the calf member 113 about the ankle joint 120 in forward and backward directions and in right and left directions. The robot includes a single-axis knee joint 140 provided between the calf member 113 and the femoral member 115, a second actuator 170 coupled to both the calf member 113 and the femoral member 115 to rotate the calf member 113 relative to the femoral member 115 about the knee joint 140 in the forward and backward directions, and a double-axis hip joint 150 (universal joint) provided between the femoral member 115 and the hip member 117. The robot includes a pair of third actuators 180 coupled to both the femoral member 115 and the hip member 117 to rotate the femoral member 115 relative to the hip member 117 about the hip joint 150 in the forward, backward, right, and left directions, and a pair of fourth actuators 190 provided on the hip member 117 to rotate the femoral member 150 relative to the hip member 117 about a vertical axis.

Hereinafter, to avoid repetitive description, a mechanism of one side of the two-legged walking robot 100 will be described due to its symmetrical configuration.

The foot member 111, the calf member 113, the femoral member 115 and the hip member 117 function like bones of a human leg and are made of a rigid material strong enough to support an upper body (not shown) to be placed on the hip member 117.

The ankle joint 120 includes a first yoke 121 incorporated with an upper part of the foot member 111, a second yoke 131 incorporated with a lower part of the calf member 113 and coupled to the first yoke 121 so as to rotate the foot member 111 relative to the calf member 113, and a double-axis trunnion 130 to combine the first yoke 121 with the second yoke 131 to allow relative rotation between the first yoke 121 and the second yoke 131 in forward and backward directions and in right and left directions.

The first yoke 121 includes a first bracket 123 incorporated with the upper part of the foot member 111, and a pair of first supporters 125 upwardly extended from front and rear end parts of the first bracket 123. The first supporters 125 are each provided with holes 128 to which opposite ends of a first-axle 127 of the trunnion 130 are rotatably inserted, thereby allowing the first yoke 121 to be rotated relative to the second yoke 131 in the left and right directions.

The second yoke 131 includes a second bracket 133 incorporated with the lower part of the calf member 113, and a pair of second supporters 135 downwardly extended from left and right end parts of the second bracket 133. The second supporters 135 are each provided with the holes 128 to which opposite end parts of a second-axle 137 incorporated with the first-axle 127 are rotatably inserted, thereby allowing the first yoke 121 to be pivoted relative to the second yoke 131 in the forward and backward directions.

The trunnion 130 includes the first-axle 127 inserted in the holes 128 of the first supporters 125 in the forward and backward directions, and the second axle 137 crosswise incorporated with the first-axle 127 and inserted in the holes 128 of the second supporters 135 in the left and right directions.

Thus, the foot member 111 incorporated with the first yoke 121 is rotated relative to the calf member 113 incorporated with the second yoke 131 about the first-axle 127 and the second-axle 137 in the forward, backward, right, and left directions.

The knee joint 140 includes a knee hinge part 143 to connect an upper part of the calf member 111 with a lower part of the femoral member 115 to pivot the calf member 111 relative to the femoral member 115, and a gudgeon pin 141 inserted in the knee hinge part 143. Thus, the calf member 113 is rotated relative to the femoral member 115 about the knee joint 140 in the forward and backward directions.

The hip joint 150 includes a third yoke 151 incorporated with an upper part of the femoral member 115, and a fourth yoke 155 incorporated with a lower part of the hip member 117 and coupled to the third yoke 151 so as to rotate the femoral member 115 relative to the femoral member 117. The third yoke 151 and the fourth yoke 155 are coupled to each other by a double-axis trunnion 130 like the first and second yokes 121 and 131 of the ankle joint 120, and therefore a detailed description thereof will be omitted to avoid repetitive descriptions.

Thus, the femoral member 115 is rotated relative to the hip member 117 about the hip joint 150 in the forward, backward, right, and left directions.

Further, there is provided a shaft 156 to protrude upwardly from the fourth yoke 155 of the hip joint 150. The shaft 156 passes through the hip member 117, thereby allowing the shaft 156 to rotate relative to the hip member 117 about a vertical axis.

The pair of first actuators 160 is coupled to both the foot member 111 and the calf member 113 behind the ankle joint 120 and is employed to rotate the foot member 111 relative to the calf member 113 about the ankle joint 120 in the forward, backward, right, and left directions. The foot member 111 and the calf member 113 are provided with a first link 161 and a second link 165, respectively, to be coupled to the first actuator 160. Each actuator 160, 170, 180 and 190 includes a motor (not shown), a ball screw (not shown) to be rotated by the motor, a guide rod 168 provided in a lower part of each actuator 160, 170, 180 and 190 and engaged with the ball screw so as to be linearly guided by a guide member (not shown), a moving block 167 attached to an end part of the guide rod 168, and a position sensor (not shown) connected to the guide rod 168 to sense a position of the moving block 167 moving together with the guide rod 168. Here, sensed position data of the position sensor is transmitted to a controller (not shown), and the controller controls the motor according to the sensed position data, thereby moving the moving block 167.

The first link 161 has an "L"-shape, and a lower part of the first link 161 is rotatably coupled to the first yoke 121 incorporated with the foot member 111. An upper part of the first link 161 and the moving block 167 of the first actuator 160 are rotatably combined to each other with a first hinge pin 162, thereby providing a first hinge part 163.

The second link 165 has a first part incorporated with the calf member 113. A second part of the second link 165 and an upper part of the first actuator 160 are rotatably combined to each other with a second hinge pin 166, thereby providing a second hinge part 164.

With the above configuration, hereinbelow, an operation of the ankle joint 120 and the first actuator 160 will be described with reference to FIGS. 4A and 4B.

Figure 4A:
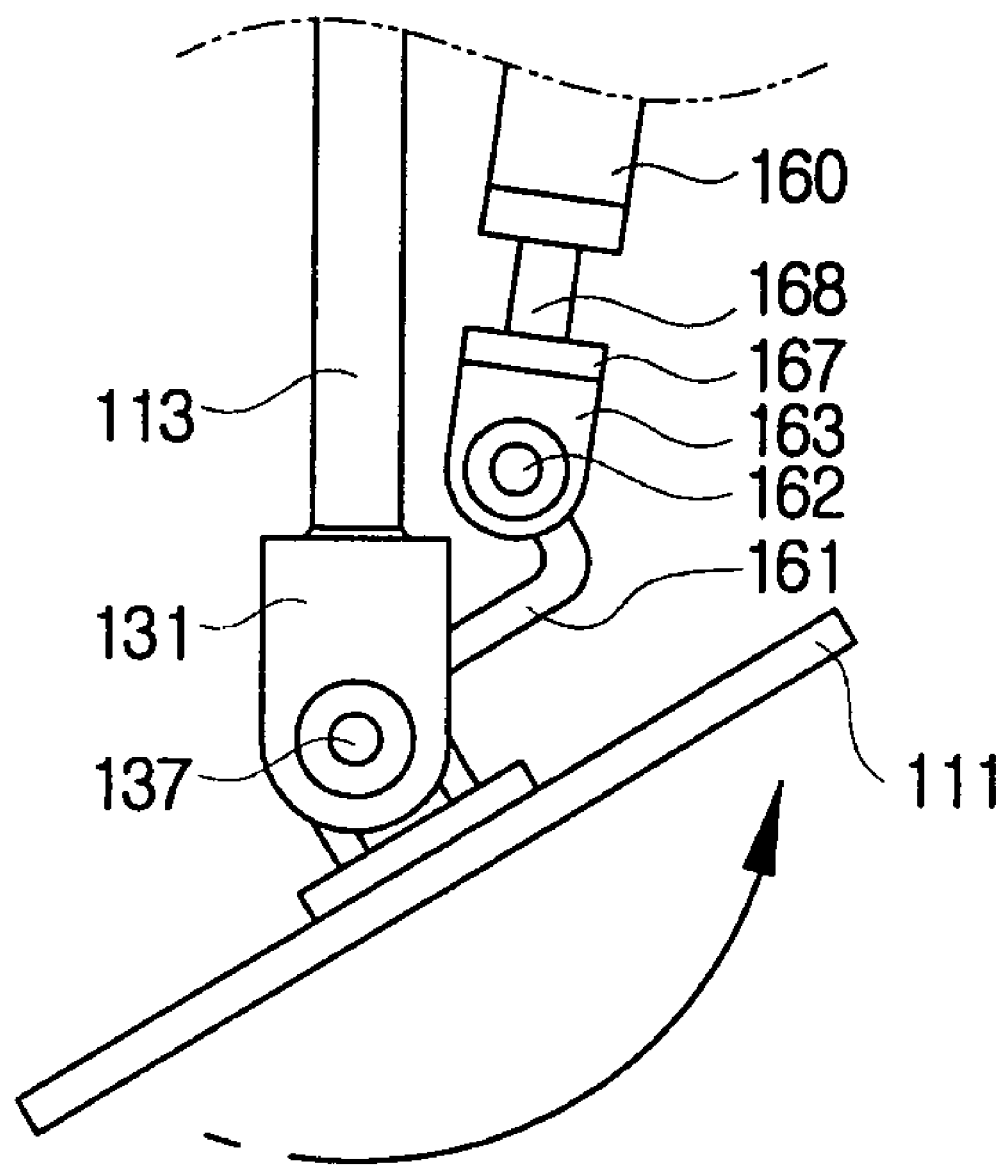
FIG. 4A is a side operation view of an ankle joint in the two-legged walking robot of FIG. 2.

As shown in FIG. 4A, when both moving blocks 167 of the pair of first actuators 160 move upward, the foot member 111 rotates backward relative to the calf member 113. Oppositely, when both moving blocks 167 of the pair of first actuators 160 move downward, the foot member 111 rotates forward relative to the calf member 113.

Figure 4B:
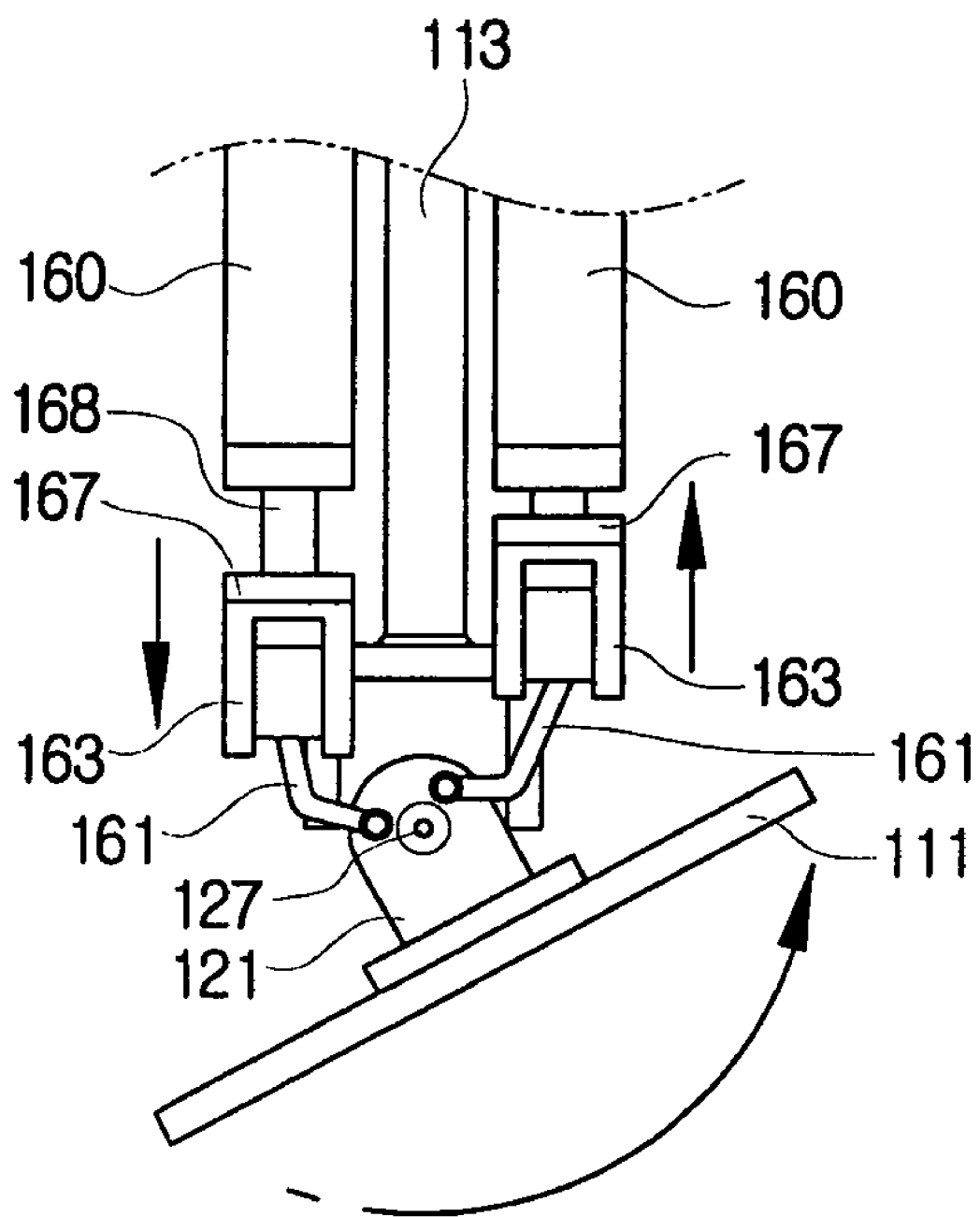
FIG. 4B is a rear operation view of the ankle joint in the two-legged walking robot of FIG. 2.

As shown in FIG. 4B, when the moving block 167 of the left first actuator 160 moves downward and the moving block 167 of the right first actuator 160 moves upward, the foot member 111 rotates rightward relative to the calf member 113. Oppositely, when the moving block 167 of the left first actuator 160 moves upward and the moving block 167 of the right first actuator 160 moves downward, the foot member 111 rotates leftward relative to the calf member 113.

Thus, the two-legged walking robot 100 according to the present invention includes the ankle joint 120 having the double-axis trunnion 130 like a universal joint, and the pair of first actuators 160 provided behind the ankle joint 120, so that the ankle joint 120 allows the foot member 111 to be rotated relative to the foot member 113 in the forward, backward, right, and left directions like a human foot.

The second actuator 170 is coupled to both the calf member 113 and the femoral member 115 in front of the femoral member 115 and is employed to rotate the calf member 113 relative to the femoral member 115 about the knee joint 140 in the forward and backward directions. The calf member 113 and the femoral member 115 are provided with a third link 171 and a fourth link 175 to be coupled to the second actuator 170, respectively.

The third link 171 has an "L"-shape, and a lower part of the third link 171 is incorporated with the calf member 113. An upper part of the third link 171 and the moving block 167 of the second actuator 170 are rotatably combined to each other with a third hinge pin 172, thereby providing a third hinge part 173. Here, the third hinge part 173 is positioned above the knee joint 140 in front of the knee joint 140, so that the calf member 113 is rotated backward relative to the femoral member 115 beyond a right angle.

The fourth link 175 has a first part incorporated with the femoral member 115, and a second part of the fourth link 175 and an upper part of the second actuator 170 are rotatably combined to each other with a fourth hinge pin 176, thereby providing a fourth hinge part 177.

With the above configuration, hereinbelow, an operation of the knee joint 140 and the second actuator 170 will be described with reference to FIGS. 5A and 5B.

Figure 5A:
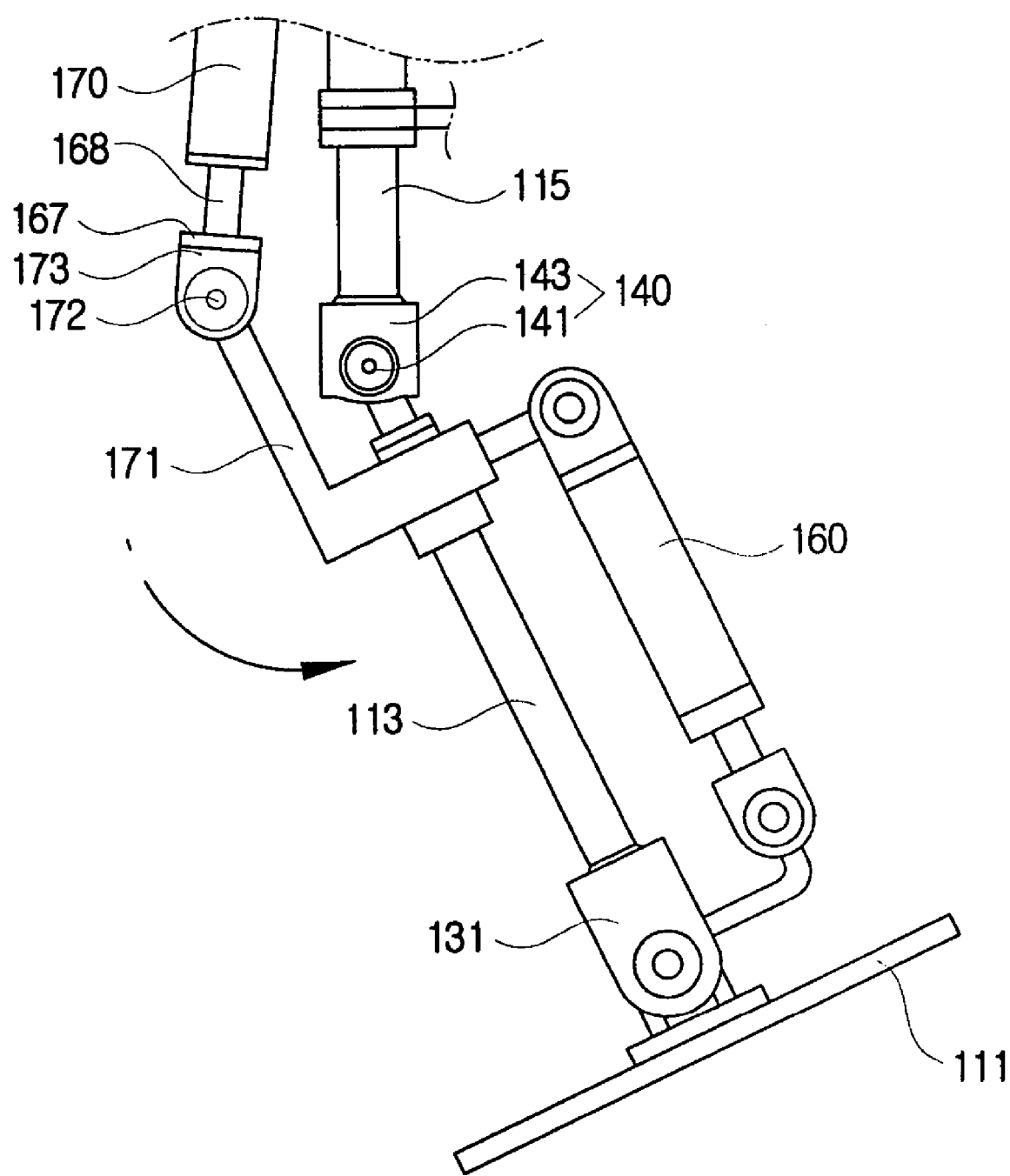
FIGS. 5A and 5B are side operation views of a knee joint in the two-legged walking robot of FIG. 2.
Figure 5B:
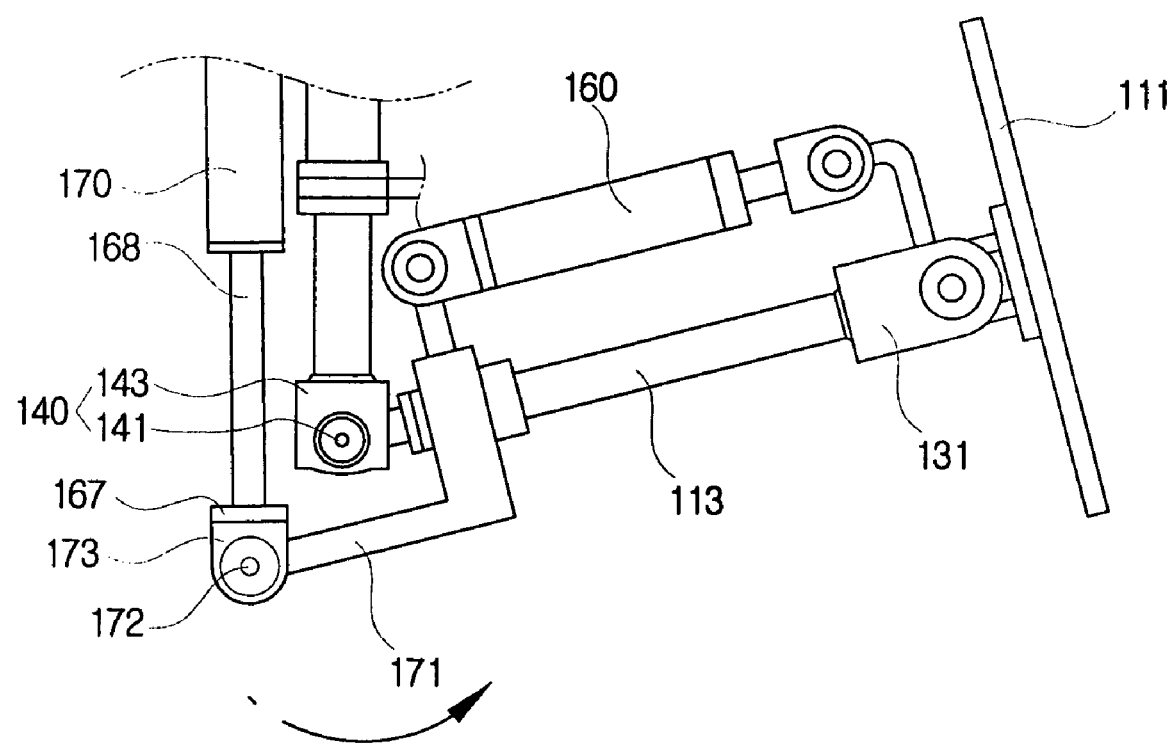

As shown in FIG. 5A, when the moving block 167 of the second actuator 170 moves downward, the calf member 113 rotates backward relative to the femoral member 115. Oppositely, when the moving block 167 of the second actuator 170 moves upward, the calf member 113 rotates forward relative to the femoral member 115. Further, as shown in FIG. 5B, the calf member 113 is rotated backward relative to the femoral member 115 beyond the right angle because the third hinge part 173 is positioned above the knee joint 140 in front of the knee joint 140.

Thus, the two-legged walking robot 100 according to the present invention includes the second actuator 170 in front of the knee joint 140, and the third hinge part 173 on which the second actuator 170 and the third link 171 are pivotably positioned above the knee joint 140, so that the knee joint 140 allows the calf member 113 to be rotated backward relative to the femoral member 115 beyond the right angle like a human knee.

The pair of third actuators 180 is coupled to both the femoral member 115 and the hip member 117 behind the femoral member 115 and is employed to rotate the femoral member 115 relative to the hip member 117 about the hip joint 150 in the forward, backward, right, and left directions. The femoral member 115 and the hip member 117 are provided with a fifth link 181 and a sixth link 185 to be coupled to the third actuators 180, respectively.

The fifth link 181 has a first part incorporated with the femoral member 115, and a second part of the fifth link 165 and the moving block 167 of the third actuators 180 are rotatably combined to each other with a fifth hinge pin 182, thereby providing a fifth hinge part 183.

The sixth link 185 has an "L"-shape, and an upper part of the sixth link 185 is incorporated with the fourth yoke 155 incorporated with the hip member 117. A lower branch part of the sixth link 185 and the upper part of the third actuators 180 are rotatably combined to each other with a sixth hinge pin 186, thereby providing a sixth hinge part 187 to allow the femoral member 115 to rotate relative to the hip member 117 in the forward and backward directions. Further, an end part of the lower branch part of the sixth link 185 is rotatable relative to the sixth hinge part 187, so that the femoral member 115 is rotated relative to the hip member 117 in the left and right directions.

Here, the sixth hinge part 187 on which the third actuators 180 and the sixth link 185 are pivoted is positioned below the hip joint 150, so that the femoral member 115 is rotated forward relative to the hip member 117 beyond a right angle.

With the above configuration, hereinbelow, an operation of the hip joint 150 and the third actuators 180 will be described with reference to FIGS. 6A through 6C.

Figure 6A:
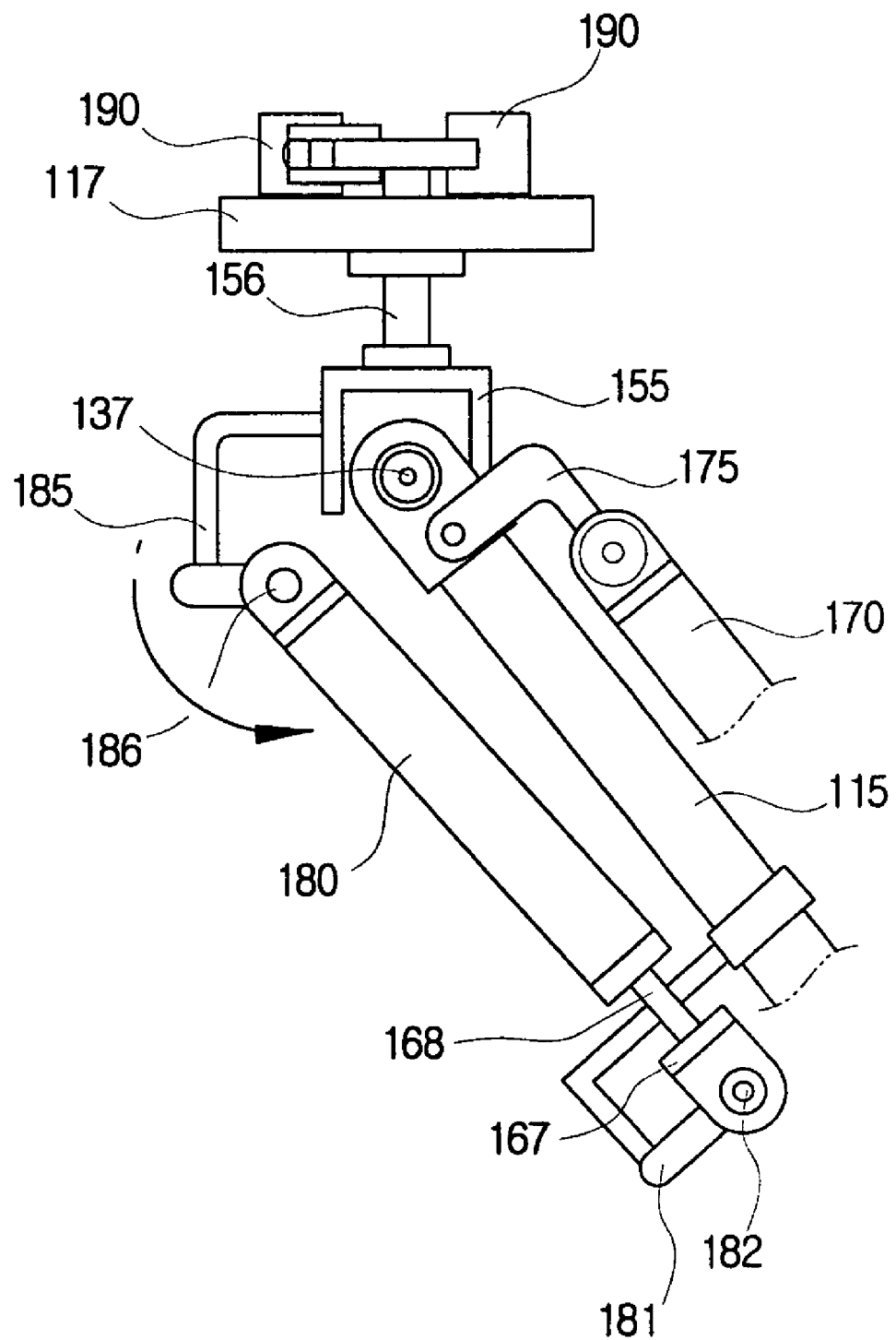
FIGS. 6A and 6B are side operation views of a hip joint in the two-legged walking robot of FIG. 2.
Figure 6B:
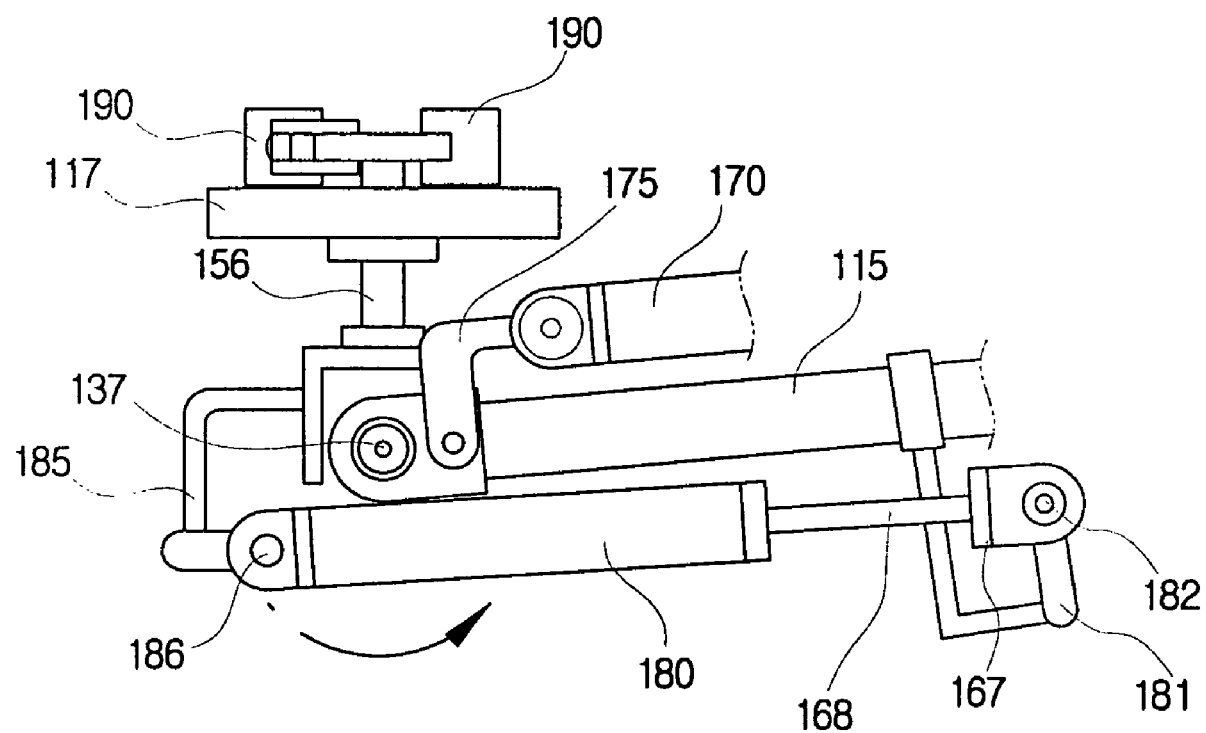
Figure 6C:
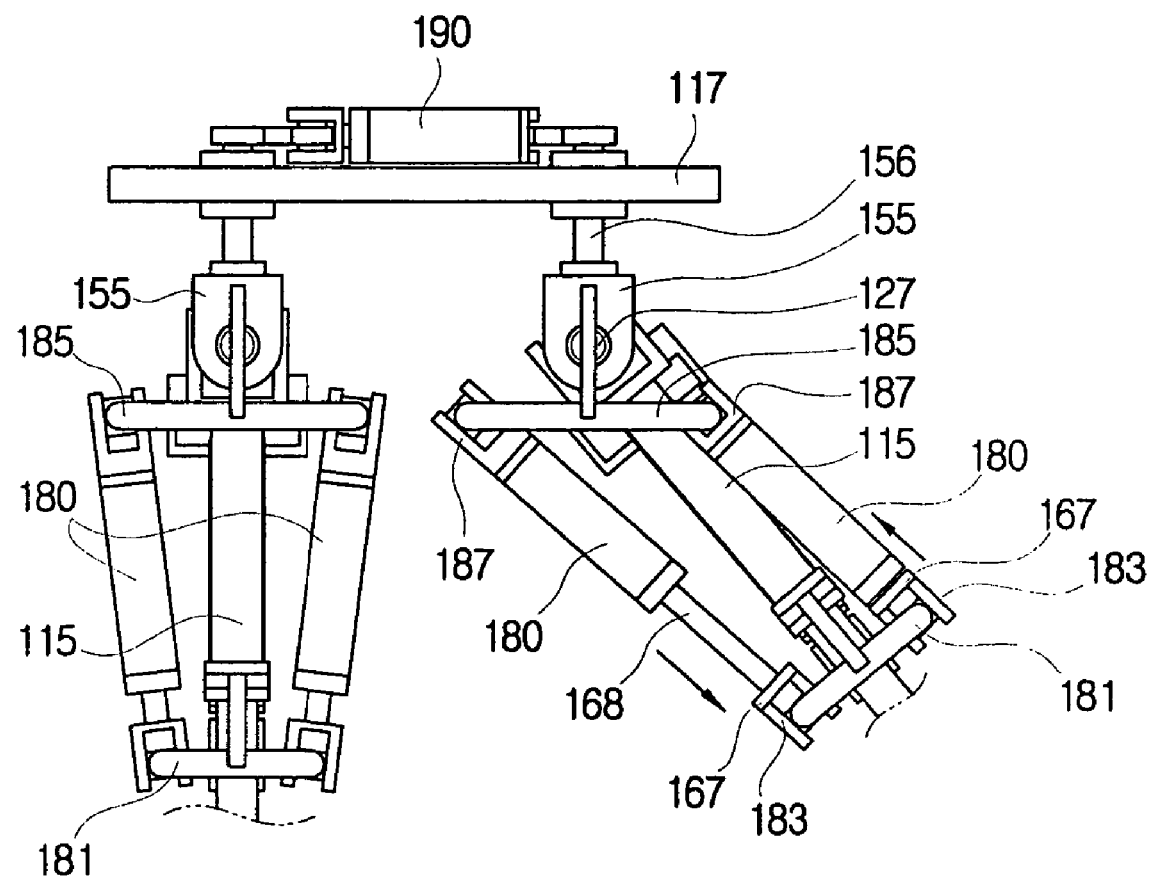
FIG. 6C is a rear operation view of the hip joint in the two-legged walking robot of FIG. 2.

As shown in FIG. 6A, when both moving blocks 167 of the pair of third actuators 180 move downward, the femoral member 115 rotates forward relative to the hip member 117. Oppositely, when both moving blocks 167 of the pair of third actuators 180 move upward, the femoral member 115 rotates backward relative to the hip member 117. As shown in FIG. 6C, when the moving block 167 of the left third actuator 180 moves downward and the moving block 167 of the right third actuator 180 moves upward, the femoral member 115 rotates rightward relative to the hip member 117. As shown in FIG. 6B, the femoral member 115 is rotated forward relative to the hip member 117 beyond the right angle because the sixth hinge part 187 is positioned below the hip joint 150 behind of the hip joint 150.

Thus, the two-legged walking robot 100 according to the present invention includes the hip joint 150 having the double-axis trunnion 130 like a universal joint, and the pair of third actuators 180 provided behind the femoral member 115, so that the hip joint 150 allows the femoral member 115 to be rotated relative to the hip member 117 in the forward, backward, right, and left directions like a human hip. Further, the hip joint 150 allows the femoral member 115 to be rotated forward relative to the hip member 117 beyond the right angle like the human hip because the sixth hinge part 187 is positioned above the hip joint 150 in front of the hip joint 150.

The pair of fourth actuators 190 is provided on the hip member 117, and is employed to rotate the pair of hip joints 150 about a vertical axis. Each fourth actuator 190 has a first part rotatably coupled to a projection 193 provided on the hip member 117 to provide a seventh hinge part 191, and a second part pivotably coupled to the shaft 156 by a seventh link 195. The shaft 156 protrudes from the fourth yoke 155 and passes through the hip member 117.

The seventh link 195 has a first part incorporated with the shaft 156, and a second part rotatably coupled to the second part of the fourth actuator 190 to provide an eighth hinge part 196.

Figure 7:
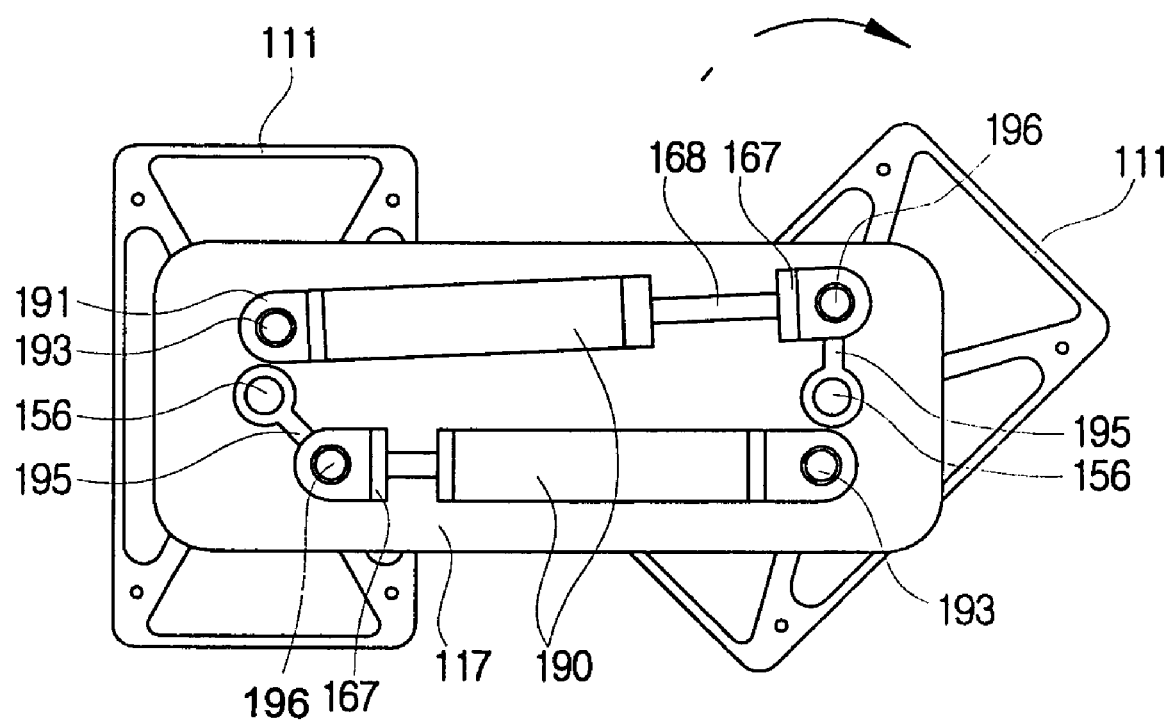
FIG. 7 is a plan operation view of a fourth actuator in the two-legged walking robot of FIG. 2.

According to the above configuration, as shown in FIG. 7, when an operation of the fourth actuator 190 causes rotation of the seventh link 195, the shaft 156 incorporated with the seventh link 195 rotates about the vertical axis, so that the hip joint 150 incorporated with the shaft 156, the femoral member 115, the calf member 113 and the foot member 111 are all rotated about the vertical axis.

Thus, the two-legged walking robot 100 according to the present invention includes the fourth actuator 190 to rotate the hip joint 150, the femoral member 115, the calf member 113 and the foot member 111 about the vertical axis of the shaft 156, thereby operating like the human hip.

As described above, the two-legged walking robot according to the present invention includes the ankle and hip joints using the universal joints, and the pairs of first and third actuators. Accordingly, the hinge part on which the third actuators and the sixth link are pivoted is positioned below the hip joint, so that the ankle and hip joints operate like the human ankle and hip.

Further, the two-legged walking robot according to the present invention includes the second actuator linked with the knee joint. Accordingly, the hinge part on which the second actuator and the third link are pivoted is positioned above the knee joint, so that the knee joint operates like the human knee.

Further, the two-legged walking robot according to the present invention includes the fourth actuators to rotate the hip joint, the femoral member, the calf member and the foot member about the vertical axis, so that the hip joint operates like the human hip.

As described above, the present invention provides a two-legged walking robot to operate like the human ankle, knee and hip.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A two-legged walking robot, comprising:
   a pair of foot members;
   a calf member provided above each of the foot members;
   a double-axis ankle joint provided between each of the respective foot member and the calf member to allow the foot member to rotate relative to the calf member in forward and backward directions and in right and left directions;
   a pair of first actuators coupled to both of each of the respective foot member and the calf member to rotate the foot member relative to the calf member about the ankle joint in the forward, backward, right, and left directions;
   a femoral member provided above each of the calf members;
   a single-axis knee joint provided between each of the respective calf member and the femoral member;
   a second actuator coupled to both of each of the respective calf member and the femoral member to rotate the calf member relative to the femoral member about the knee joint in forward and backward directions;
   a hip member provided above each of the femoral members;
   a double-axis hip joint provided between each of the respective femoral member and the hip member to allow the femoral member to rotate relative to the hip member in the forward, backward, right, and left directions; and
   a pair of third actuators coupled to both of each of the respective femoral member and the hip member to rotate the femoral member relative to the hip member about the hip joint in the forward, backward, right, and left directions,
   wherein each of the ankle joints comprise:
      a first yoke incorporated with an upper cart of the foot member; and
      a second yoke incorporated with a lower part of the calf member and coupled to the first yoke by a trunnion so as to rotate the foot member relative to the calf member.

2. The robot according to claim 1, wherein:
   the first yoke comprises a first bracket incorporated with the upper part of the foot member, a pair of first supporters upwardly extended from front and rear end parts of the first bracket, and a first-axle to pass through the first supporters in the forward and backward directions, and
   the second yoke comprises a second bracket incorporated with the lower part of the calf member, a pair of second supporters downwardly extended from left and right end parts of the second bracket, and a second-axle to pass through second supporters in left and right directions and crosswise incorporated with the first-axle.

3. The robot according to claim 2, wherein each of the hip joints comprise:
   a third yoke incorporated with an upper part of the femoral member; and
   a fourth yoke incorporated with a lower part of the hip member and coupled to the third yoke so as to rotate the femoral member relative to the femoral member.

4. The robot according to claim 3, wherein each of the hip joints are combined to the hip member rotatably about a vertical axis, and the two-legged walking robot further comprises:
   a pair of fourth actuators provided in the hip member to rotate each of the respective femoral members relative to the hip member.

5. The robot according to claim 4, further comprising:
   a first link provided between a lower part of the respective first actuators and the foot member so as to rotate the first actuators relative to the foot member; and
   a second link provided between an upper part of the respective first actuators and the calf member so as to rotate the first actuators relative to the calf member.

6. The robot according to claim 5, further comprising:
   a third link provided between a lower part of the respective second actuator and the calf member so as to rotate the second actuator relative to the calf member; and
   a fourth link provided between an upper part of the respective second actuator and the femoral member so as to rotate the second actuator relative to the femoral member.

7. The robot according to claim 6, further comprising:
   a fifth link provided between a lower part of the respective third actuators and the femoral member so as to rotate the third actuators relative to the femoral member; and
   a sixth link provided between an upper part of the respective third actuators and the hip member so as to rotate the third actuators relative to the hip member.

8. The robot according to claim 7, wherein:
   the pair of third actuators is provided behind the femoral member,
   a lower part of the sixth link is rotatably coupled to the upper part of the third actuators, and
   a hinge part on which the sixth link and the third actuators are pivoted is positioned below the hip joint, so that the femoral member is rotated forward relative to the hip member beyond a right angle.

9. The robot according to claim 7, wherein a first part of the fifth link is incorporated with the femoral member, and a part of the sixth link is incorporated with the fourth yoke incorporated with the hip member.

10. The robot according to claim 9, further comprising:
    a fifth hinge pin to rotatably combine a second part of the fifth link and a moving block of the third actuators, providing a fifth hinge part; and
    a sixth hinge pin to rotatably combine a branched part of the sixth link and a part of the third actuators, providing a sixth hinge part.

11. The robot according to claim 6, wherein:
    the second actuator is provided in front of the calf member,
    an upper part of the third link is pivotably coupled to the lower part of the second actuator, and
    a hinge part on which the third link and the second actuator are pivoted is positioned above the knee joint, so that the calf member is rotated backward relative to the femoral member beyond a right angle.

12. The robot according to claim 6, wherein a part of the third link is incorporated with the calf member, and the fourth link comprises a first part incorporated with the femoral member.

13. The robot according to claim 12, further comprising:
a third hinge pin to rotatably combine a part of the third link and a moving block of the second actuator, providing a third hinge part; and
a fourth hinge pin to rotatably combine a second part of the fourth link and a part of the second actuator, providing a fourth hinge part.

14. The robot according to claim 5, wherein a part of the first link is rotatably coupled to the first yoke incorporated with the foot member, and the second link comprises a first part incorporated with the calf member.

15. The robot according to claim 14, further comprising:
a first hinge pin to rotatably combine the first link and a moving block of the first actuators, providing a first hinge part; and
a second hinge pin to rotatably combine a second part of the second link and a part of the first actuators, providing a second hinge part.

16. The robot according to claim 4, further comprising
a shaft to protrude upwardly from the fourth yoke of the hip joint,
wherein the shaft passes through the hip member and is rotatably coupled to the hip member, and
the fourth actuators are rotatably coupled to the shaft to rotate the shaft.

17. The robot according to claim 16, wherein the fourth actuators comprise a first part to rotatably couple to a projection provided on the hip member, providing a seventh hinge part, and a second part to pivotably couple to the shaft.

18. The robot according to claim 17, further comprising:
a seventh link having a first part incorporated with the shaft, and a second part to rotatably couple to the second part of the fourth actuators, providing an eighth hinge part.

19. The robot according to claim 18, wherein the fourth actuators rotate the seventh link to rotate the shaft incorporated with the seventh link about a vertical axis, rotating the hip joints, the femoral members, the calf members, and the foot members about the vertical axis.

20. The robot according to claim 2, wherein each of the ankle joints further comprise:
a double-axis trunnion to combine the first yoke with the second yoke to allow relative rotation between the first yoke and the second yoke in the forward, backward, right and left direction.

21. The robot according to claim 20, wherein the first supporters are provided with holes to which opposite ends the first axle are rotatably inserted, allowing the first yoke to be rotated relative to the second yoke in the left and right direction.

22. The robot according to claim 21, wherein the second supporters are provided with hole to which opposite ends of the second axle are rotatably inserted, allowing the first yoke to be pivoted relative to the second yoke in the forward and backward direction.

23. The robot according to claim 1, further comprising:
a first link provided between a lower part of the respective first actuators and the foot member so as to rotate the first actuators relative to the foot member; and
a second link provided between an upper part of the respective first actuators and the calf member so as to rotate the first actuators relative to the calf member.

24. The robot according to claim 23, further comprising:
a third link provided between a lower part of the respective second actuator and the calf member so as to rotate the second actuator relative to the calf member; and
a fourth link provided between an upper part of the respective second actuator and the femoral member so as to rotate the second actuator relative to the femoral member.

25. The robot according to claim 24, further comprising:
a fifth link provided between a lower part of the respective third actuators and the femoral member so as to rotate the third actuators relative to the femoral member; and
a sixth link provided between an upper part of the respective third actuators and the hip member so as to rotate the third actuators relative to the hip member.

26. The robot according to claim 25, wherein:
the pair of third actuators is provided behind the femoral member,
a lower part of the sixth link is rotatably coupled to the upper part of the third actuators, and
a hinge part on which the sixth link and the third actuators are pivoted is positioned below the hip joint, so that the femoral member is rotated forward relative to the hip member beyond a right angle.

27. The robot according to claim 24, wherein:
the second actuator is provided in front of the calf member,
an upper part of the third link is pivotably coupled to the lower part of the second actuator, and
a hinge part on which the third link and the second actuator are pivoted is positioned above the knee joint, so that the calf member is rotated backward relative to the femoral member beyond a right angle.

28. The robot according to claim 1, wherein the foot members, the calf members, the femoral members and the hip member are made of a rigid material to support a body to be placed on the hip member.

29. The robot according to claim 1, wherein each of the single-axis knee joints comprise:
a knee hinge part to connect a part of the calf member with a part of the femoral member to pivot the calf member relative to the femoral member; and
a gudgeon pin to insert into the knee hinge part, allowing the calf member to rotate relative to the femoral member about the knee joint in the forward and backward directions.

30. The robot according to claim 29, wherein each of the single-axis knee joints further comprise:
a double-axis trunnion to combine the third yoke with the fourth yoke to allow relative rotation between the third yoke and the fourth yoke in the forward, backward, right and left directions.

31. A two-legged walking robot, comprising:
a pair of foot members;
a calf member provided above each of the foot members;
a double-axis ankle joint provided between each of the respective foot member and the calf member to allow the foot member to rotate relative to the calf member in forward and backward directions and in right and left directions;
a pair of first actuators coupled to both of each of the respective foot member and the calf member to rotate the foot member relative to the calf member about the ankle joint in the forward, backward, right, and left directions;

a femoral member provided above each of the calf members;

a single-axis knee joint provided between each of the respective calf member and the femoral member;

a second actuator coupled to both of each of the respective calf member and the femoral member to rotate the calf member relative to the femoral member about the knee joint in forward and backward directions;

a hip member provided above each of the femoral members;

a double-axis hip joint provided between each of the respective femoral member and the hip member to allow the femoral member to rotate relative to the hip member in the forward, backward, right, and left directions;

a pair of third actuators coupled to both of each of the respective femoral member and the hip member to rotate the femoral member relative to the hip member about the hip joint in the forward, backward, right, and left directions; and a pair of fourth actuators provided on the hip member to rotate each of the respective femoral members relative to the hip member, wherein each of the first, second, third, and fourth actuators comprise:

a motor;

a ball screw to be rotated by the motor;

a guide rod provided in a part of each of the actuators to engage with the ball screw to be linearly guided by a guide member;

a moving block to attach to an end part of the guide rod; and a position sensor connected to the guide rod to sense a position of the moving block which moves together with the guide rod.

32. The robot according to claim 31, wherein:

when the moving block of the first actuators moves upward, the foot member rotates backward relative to the calf member, and when the moving block of the first actuators moves downward, the foot member rotates forward relative to the calf member.

33. The robot according to claim 31, wherein:

when the moving block of a left first actuator of the first actuators moves downward and the moving block of a right first actuator of the first actuators moves upward, the foot member rotates rightward relative to the calf member, and when the moving block of the left first actuator moves upward and the moving black of the right first actuator moves downward, the foot member rotates leftward relative to the calf member.

34. The robot according to claim 31, wherein:

when the moving block of the second actuator moves downward, the calf member rotates backward relative to the femoral member, and when the moving block of the second actuator moves upward, the calf member rotates forward relative to the femoral member.

35. The robot according to claim 31, wherein:

when the moving block of the third actuators moves downward, the femoral member rotates forward relative to the hip member, and when the moving block of the third actuators moves upward, the femoral member rotates backward relative to the hip member.

36. The robot according to claim 31, wherein, when the moving block of a left third actuator of the third actuators moves downward and the moving block of a right third actuator of the third actuators moves upward, the femoral member rotates rightward relative to the hip member.

* * * * *

UNITED STATES PATENT AND TRADEMARK OFFICE
CERTIFICATE OF CORRECTION

| | | |
|---|---|---|
| PATENT NO. | : 7,099,743 B2 | Page 1 of 1 |
| APPLICATION NO. | : 10/643898 | |
| DATED | : August 29, 2006 | |
| INVENTOR(S) | : Yong-kwun Lee et al. | |

It is certified that error appears in the above-identified patent and that said Letters Patent is hereby corrected as shown below:

Title Page Column 2 item 56 (Other Publications), Line 2, change "p." to --pp.--.

Column 9, Line 53, change "cart" to --part--.

Column 11, Line 26, after "comprising" insert --:--.

Column 11, Line 53, change "direction." to --directions.--.

Column 11, Line 58, change "direction." to --directions.--.

Column 11, Line 60, change "hole" to --holes--.

Column 11, Line 63, change "direction." to --directions.--.

Column 14, Line 15, change "black" to --block--.

Signed and Sealed this

Twenty-third Day of January, 2007

JON W. DUDAS
*Director of the United States Patent and Trademark Office*